(12) United States Patent
Quijano

(10) Patent No.: US 9,365,092 B2
(45) Date of Patent: Jun. 14, 2016

(54) CONSOLE DUCT HOOK AND SNAP FEATURE

(75) Inventor: Jonathan Joseph Quijano, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 794 days.

(21) Appl. No.: 13/434,958

(22) Filed: Mar. 30, 2012

(65) Prior Publication Data

US 2013/0260661 A1 Oct. 3, 2013

(51) Int. Cl.
*B60H 1/00* (2006.01)
*B60H 1/26* (2006.01)

(52) U.S. Cl.
CPC .................... *B60H 1/00564* (2013.01)

(58) Field of Classification Search
CPC .......... B60H 1/345; B60H 2001/3471; B60H 1/00564; H05K 7/20172
USPC .............................................. 454/143
See application file for complete search history.

(56) References Cited

U.S. PATENT DOCUMENTS

| | | | | |
|---|---|---|---|---|
| 2,727,552 A * | 12/1955 | Chvesta | ................ | F16B 37/044 411/112 |
| 3,218,017 A * | 11/1965 | Butler | .................... | A47H 1/104 248/263 |
| 3,490,604 A * | 1/1970 | Klein | .................... | A47B 57/402 211/191 |
| 4,194,715 A * | 3/1980 | Forman | ................ | A61G 7/0503 248/311.2 |
| 4,889,305 A * | 12/1989 | Mahan | .................... | A47H 1/102 248/253 |
| 4,935,988 A * | 6/1990 | Ford | ........................ | A47H 1/02 16/87.4 R |
| 4,961,296 A * | 10/1990 | Morehouse | ............ | A47H 1/102 160/330 |
| 5,011,198 A * | 4/1991 | Gruenberg | ............ | G06F 1/1616 190/115 |
| 5,082,226 A * | 1/1992 | Mahan | .................... | A47H 1/102 248/253 |
| 5,116,007 A * | 5/1992 | Von Gunton | ........... | A47B 57/42 108/108 |
| 5,513,069 A * | 4/1996 | Ohgami | ................ | G06F 1/1616 361/679.39 |
| 5,737,810 A * | 4/1998 | Krauss | .................. | A44B 11/266 24/625 |
| 5,887,731 A * | 3/1999 | Thalenfeld | ............ | A47F 5/0869 211/103 |
| 6,095,595 A | 8/2000 | Galbraith | | |
| 6,246,004 B1 * | 6/2001 | Faccin | .................... | H02B 1/202 174/135 |
| 6,343,011 B1 * | 1/2002 | Yu | .......................... | G06F 1/181 165/104.33 |
| 6,382,295 B1 * | 5/2002 | Nicholson | ............... | E06B 9/323 160/178.1 R |
| 6,514,027 B1 | 2/2003 | Yiu et al. | | |
| 6,556,437 B1 * | 4/2003 | Hardin | ............... | H05K 7/20172 361/679.48 |
| 6,708,955 B2 * | 3/2004 | Cummings | ............. | E04H 17/02 256/1 |
| 8,225,464 B2 * | 7/2012 | Robson | ................. | F16B 5/0635 24/297 |
| 8,631,578 B2 * | 1/2014 | Glasspoole | ............. | F01D 5/027 29/889 |
| 8,649,172 B2 * | 2/2014 | Kuo | .......................... | G06F 1/20 361/679.47 |
| 2002/0024223 A1 * | 2/2002 | Bolduc | ..................... | E05C 1/02 292/138 |
| 2005/0274868 A1 * | 12/2005 | McCance | ............... | A47H 1/122 248/674 |
| 2009/0203305 A1 * | 8/2009 | Abro | .................. | B60H 1/00564 454/152 |

* cited by examiner

*Primary Examiner* — Steven B McAllister
*Assistant Examiner* — Jonathan Cotov
(74) *Attorney, Agent, or Firm* — Dinsmore & Shohl LLP

(57) ABSTRACT

An assembly for a console of a vehicle including a main body, a first hook connected to the main body wherein the hook is positioned adjacent and spaced apart from a second hook. A duct member having an aperture connects to the first hook and the second hook. During installation of the duct portion the aperture is first angled and positioned over a first hook then rotated downwards over the second hook wherein the second hook includes a ramped portion. The duct portion is snapped into place and is secured tightly over both the first hook and the second hook. During installation and rotation of the duct portion over the first hook and the second hook, the first hook and the second hook resiliently bend towards each other in compression and are relaxed once the aperture is fully over the first hook and the second hook.

20 Claims, 3 Drawing Sheets

CONSOLE DUCT HOOK AND SNAP FEATURE

FIELD OF THE INVENTION

This invention relates generally to console attachment features. In particular, this invention relates to an attachment means for attaching a duct to a console assembly.

BACKGROUND OF THE INVENTION

It is well known in the art to attach a duct to a vehicle console assembly to move air from the front of the vehicle to the rear passengers within the vehicle. Console assemblies are commonly known to include ductwork within to move the air to the rear passengers. It is commonly known for the duct to attach to the console assembly using a tab on a main body and an aperture on the duct portion. To attach the duct portion to the main body via the tab, the assembly worker is required to exert extreme force in a downward vertical direction to install the duct portion onto the main body. This ergonomically unfriendly installment procedure and apparatus creates problems during assembly. Accordingly, there exists a need in the art to provide a more ergonomically friendly apparatus for installation of a duct to a vehicle console assembly.

SUMMARY OF THE INVENTION

The present invention relates to a center console assembly for an automotive vehicle having ducts contained therein. The assembly includes a main body, a first hook connected to the main body wherein the hook is positioned adjacent and spaced apart from a second hook. A duct member having an aperture connects to the first hook and the second hook. During installation of the duct portion the aperture is first angled and positioned over a first hook then rotated downwards over the second hook wherein the second hook includes a ramped portion. The duct portion is snapped into place and is secured tightly over both the first hook and the second hook. During installation and rotation of the duct portion over the first hook and the second hook, the first hook and the second hook resiliently bend towards each other in compression and are relaxed once the aperture is fully over the first hook and the second hook.

DETAILED DESCRIPTION OF THE INVENTION

The present invention relates to a hook and snap assembly for attachment of a duct portion to a vehicle console. The assembly generally includes two spaced apart resilient hooks attached to a main body and a duct portion having an aperture wherein that aperture is installed over the first hook and rotated onto the second hook into a snapped installed position.

Figure 1:
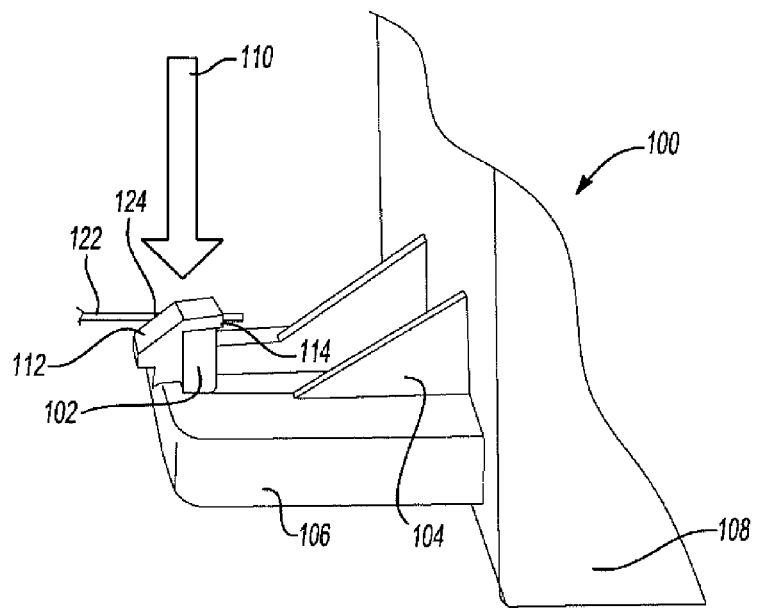
FIG. 1 shows a side view of the prior art.

FIG. 1 illustrates a side perspective view of the prior art. The hook assembly 100 illustrates a hook 102 connected to a main body 106 having supports 104. The main body 106 is connected to a console 108. The hook assembly 102 is a one piece construction having a ramped edge 112 and a small hook portion 114. During installation the user installs the duct portion 122 having the aperture 124 over the hook 102. The duct portion 122 is forced over the hook 102 by means of force 110 exerted by the assembly worker. The force 110 required to push the duct portion 122 over the hook 104 is large. Furthermore, the installation angle of the prior art is not ergonomically friendly and may be straining on the assembly line worker. The console assembly 108 is a standard console assembly having ductwork contained therein. Once the duct portion 122 is installed, the air from the forward of the vehicle is operable to travel through the console 108 to the rear passengers of the vehicle. The prior art 100 requires an improvement to improve ergonomic efficiency of the installation procedure.

Figure 2:
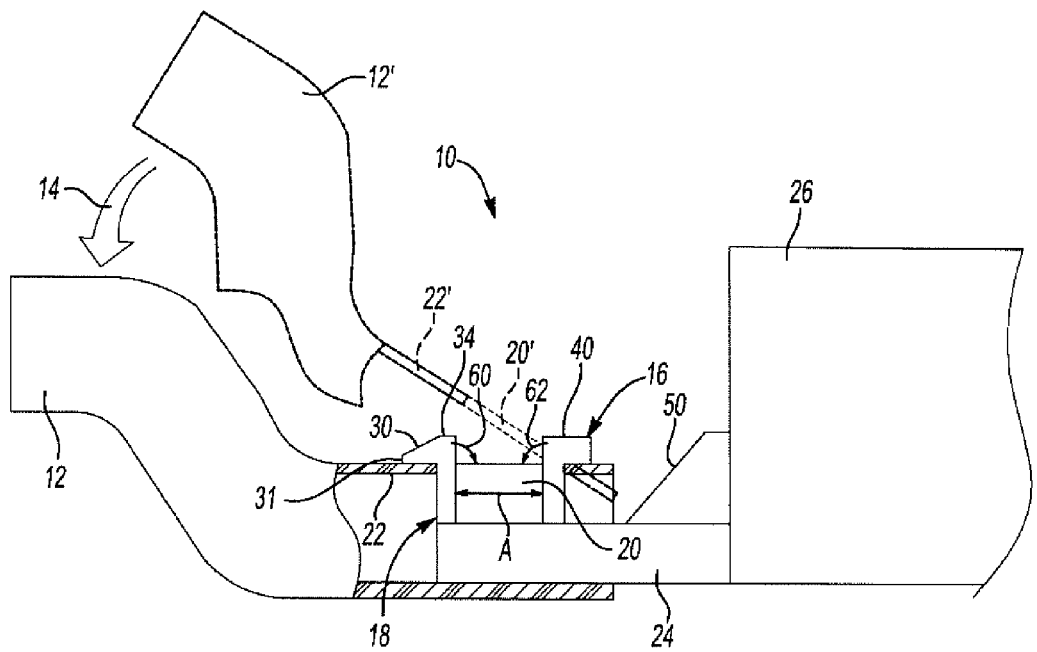
FIG. 2 is a side view of the first hook and the second hook during installation of the duct portion.

FIG. 2 illustrates a side view of the present invention. The hook assembly 10 is shown with a duct portion 12 wherein the duct portion 12 is installed as shown by the directional arrow 14. A first hook 16 and a second hook 18 are provided. The first hook 16 includes a planar upper surface 40 extending away from the base portion 46 of the hook 16. The hook 16 further includes an underside surface 42. The hook 16 is formed of a one piece construction and includes a generally 90 degree bend forming the hook structure. The hook 16 is molded to the main body 24. The hook 16 is made of a resilient plastic or polymer or polymer-like material allowing for flexibility of the hook 16.

A second hook 18 is also provided attached to the main body 24. The second hook 18 includes an upper planar surface 34 and a ramped portion 30. The second hook 18 further includes an underside surface 36. The ramped portion 30 of the second hook 18 allows for the aperture of the duct portion and the duct portion to slide over the ramped surface 30 of the second hook 18 to a final installed position.

The first hook 16 and the second hook 18 are spaced apart at a predetermined distance A. The predetermined distance A will vary depending on the size of the aperture 20 of the duct portion 12.

The duct portion 12 includes a first aperture 20. The aperture 20 is generally rectangular, or other similar shape such as circular, square, etc., operable to accommodate the first hook and the second hook during installation. FIG. 2 illustrates the installation procedure of the duct portion 12. Duct portion 12' includes attachment area 22' having an aperture 20'. The aperture 20' is first hooked over the first hook 16 and rotated 14 over the second hook 18 to an installed position (shown by the duct portion 12).

During installation the first hook 16 and the second hook 18 are bent towards one another caused by the pressure of the aperture 20 of the duct portion 12. Directional arrows 60, 62 illustrate the first hook 16 and the second hook 18 bending towards one another during the installation of the duct portion 12. As the aperture 20 slides down the ramped portion 30 of the second hook 18, and as the aperture reaches the end portion 31 of the ramped portion 30, the first hook 16 and the second hook 18 are snapped back to a resting position having the aperture 20 of the duct portion 12 securely resting adjacent the underside surface 42 of the first hook 16 and adjacent the underside surface 36 of the second hook 18.

Figure 3:
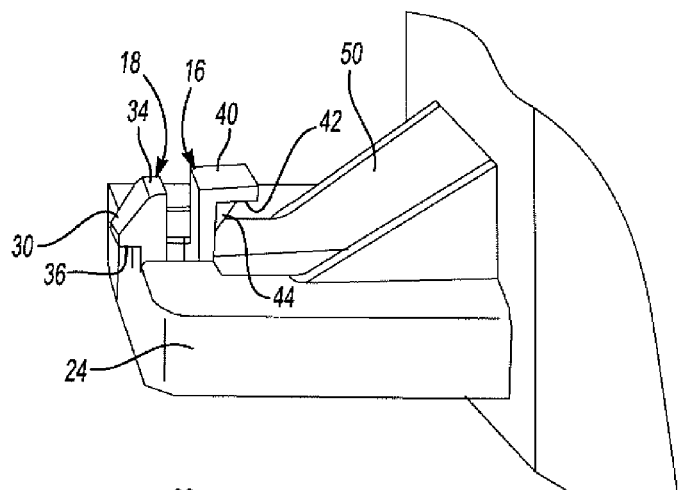
FIG. 3 is a perspective view of the first hook and the second hook attached to the main body.

FIG. 3 illustrates the details of the first hook 16 and the second hook 18. The first hook 16 includes an upper planar surface 40 and an underside surface 42. The first hook 16 connects to the main body 24. The main body 24 further connects to the console assembly 26. Support mechanisms 50 are further provided attaching the main body 24 to the console 26. FIG. 3 further illustrates the second hook 18 having an upper planar surface 34 and a ramped surface 30. The second hook 18 further includes an underside surface 36.

Figure 4:
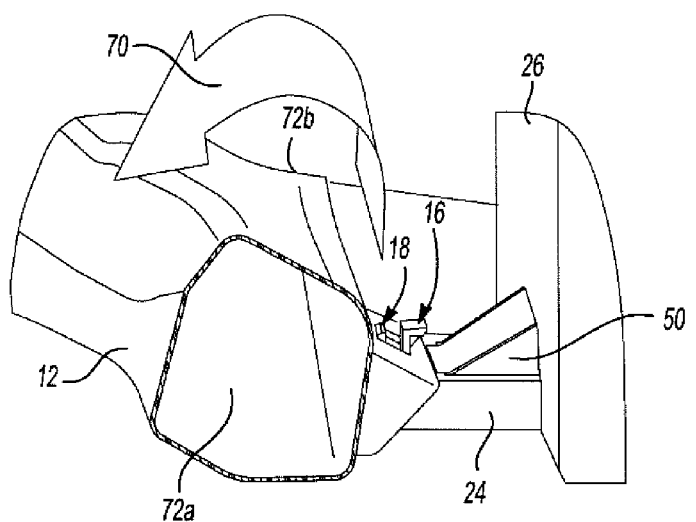
FIG. 4 is a side perspective view illustrating the rotation of the duct portion over the first hook and the second hook.

FIG. 4 illustrates the rotation of the duct portion 12 over the first hook 16 and the second hook 18. The duct portion 12 is generally T shaped and includes one inlet 82 and two outlets 72a and 72b. Directional arrow 70 illustrates the rotation of the duct portion 12 first over the first hook 16 and then onto the ramp portion 30 of the second hook 18, down the ramp portion 30 to a final fixed position.

Figure 5:
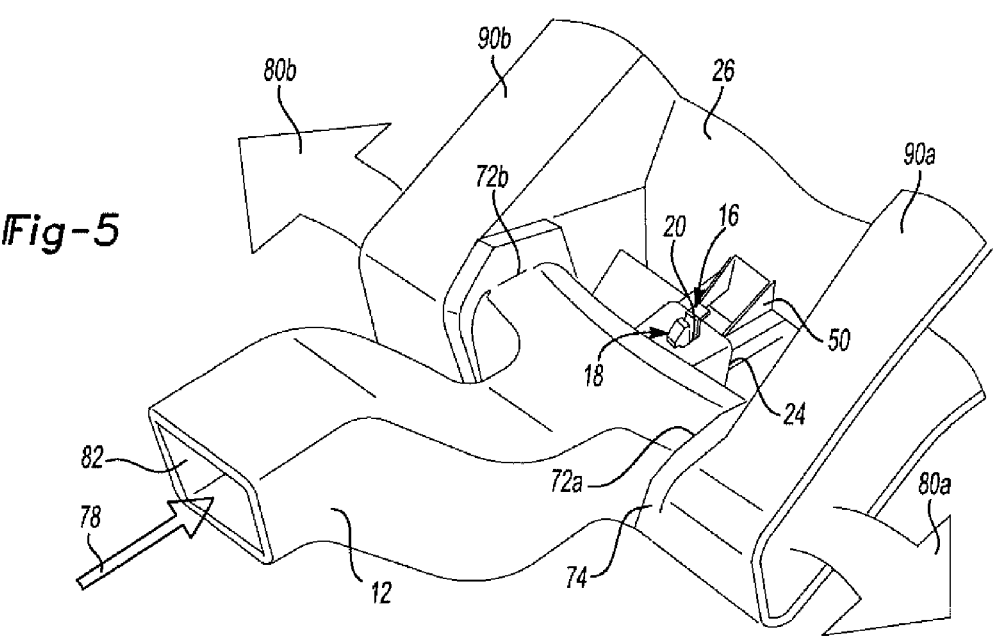
FIG. 5 is a perspective view showing the installed duct portion illustrating air flowing through the ducts into the center console.

The first hook 16 and the second hook 18 each include an engaging portion 36, 42 respectively. This engaging portion is also known as the underside surface of both the first hook 16 and the second hook 18. The engaging portions 36, 42 rest adjacent the aperture FIG. 5 illustrates the air flow of the final installed duct assembly 12. The duct assembly 12 having an aperture 20 rests over the first hook 16 spaced apart from the second hook 18. The first hook 16 and the second hook 18 are connected to the main body 24 of the assembly. The duct assembly 12 is generally T shaped having an inlet 82 and two outlets 72a, 72b. Air flows 78 through the first inlet 82 and splits at the T shaped portion to the first outlet 72a and the second outlet 72b. Air flows 80a, 80b through the console ducts 90a, 90b to the passengers in the rear of the vehicle.

The hook and snap engagement provided by the first hook 16 and the second hook 18 wherein the second hook 18 includes the ramped portion 30 allowing for resilient bending of the first hook 16 and the second hook 18 to a snap fit engagement creates a secure attachment of the duct portion 12 to the main body 24 and therefore to the console 26.

Figure 6:
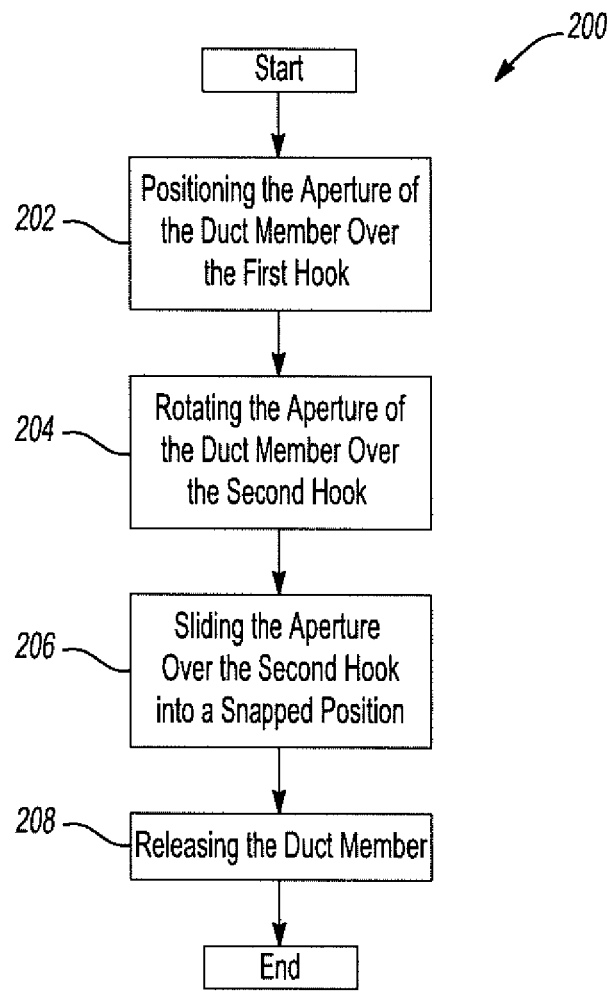
FIG. 6 is a flowchart illustrating the method according to claim 11.

A method of installing a duct member onto a console assembly is also provided. The method is further shown in FIG. 6. The method uses a first hook, a second hook and an aperture located on the duct member. The method 200 includes the steps of positioning 202 the aperture of the duct member over the first hook, rotating 204 the aperture of the duct member over the second hook, sliding 206 the aperture over the second hook into a snapped position and releasing 208 the duct member thereby allowing the duct member to rest securely over the first hook and the second hook wherein the first hook and the second hook are tensioned thereby exerting a force on the aperture.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A console assembly for an automotive vehicle having ducts contained therein, the assembly comprising:
   a main body;
   a first hook connected to the main body, the first hook positioned adjacent to and spaced apart from a second hook; and
   a duct member having an aperture, the aperture extending through the duct member, the aperture of the duct member connected to the first hook and the second hook, the duct member positioned around the main body;
   wherein the first hook is positioned entirely through the aperture of the duct member and wherein the aperture of the duct member is rotated over the second hook and rotated onto the main body to a final installed position around the main body, after installation the first hook and the second hook each exerting a force against the aperture of the duct member thereby securing the duct member against the first hook and the second hook.

2. The assembly of claim 1 wherein the first hook and the second hook are made of a resilient material.

3. The assembly of claim 1 wherein the first hook is a generally perpendicular arrangement.

4. The assembly of claim 1 wherein the second hook includes a ramped portion allowing the aperture to slide over the ramped portion to an installed position.

5. The assembly of claim 1 wherein the first hook and the second hook each have an engaging member.

6. The assembly of claim 5 wherein the first hook and the second hook each have a planar side.

7. The assembly of claim 6 wherein the planar side of each of the first hook and the second hook are positioned adjacent one another.

8. The assembly of claim 7 wherein the planar side of each of the first hook and the second hook are spaced apart from one another.

9. The assembly of claim 1 wherein the aperture of the duct member is rectangular.

10. The assembly of claim 1 wherein the first hook and the second hook are mounted to an extend member from the main body.

11. A method of installing a duct member onto a console assembly, the console assembly having a main body, the method using a first hook, a second hook and an aperture located on the duct member, the method comprising the steps of:
   positioning the first hook through the aperture of the duct member;
   rotating the aperture of the duct member over the second hook;
   rotating the duct member over the main body to position the duct member around the main body;
   sliding the aperture over the second hook into a installed position; and
   releasing the duct member where the second hook wherein the first hook and the second hook are tensioned thereby exerting a force on the aperture.

12. A console assembly for an automotive vehicle having ducts contained therein, the assembly comprising:
   a main body;
   a first hook connected to the main body, the hook positioned adjacent to and spaced apart from a second hook; and
   a duct member having an aperture, the aperture of the duct member connected to the first hook and the second hook, the duct member positioned around the main body;
   a first positioned defined when the first hook is positioned through the aperture of the duct member;
   the aperture of the duct member is rotated over the second hook and rotated onto and around the main body to a second position, the second position defined when the first hook and the second hook each adapted to exert a force against the aperture of the duct member.

13. The assembly of claim 12 wherein the first hook and the second hook are made of a resilient material.

14. The assembly of claim 12 wherein the first hook is a generally perpendicular arrangement.

15. The assembly of claim 12 wherein the second hook includes a ramped portion allowing the aperture to slide over the ramped portion to an installed position.

16. The assembly of claim 12 wherein the first hook and the second hook each have an engaging member.

17. The assembly of claim 16 wherein the first hook and the second hook each have a planar side.

18. The assembly of claim 17 wherein the planar side of each of the first hook and the second hook are positioned adjacent one another.

19. The assembly of claim 18 wherein the planar side of each of the first hook and the second hook are spaced apart from one another.

20. The assembly of claim 12 wherein the first hook and the second hook are mounted to an extend member from the main body.

\* \* \* \* \*